Patented Aug. 22, 1944

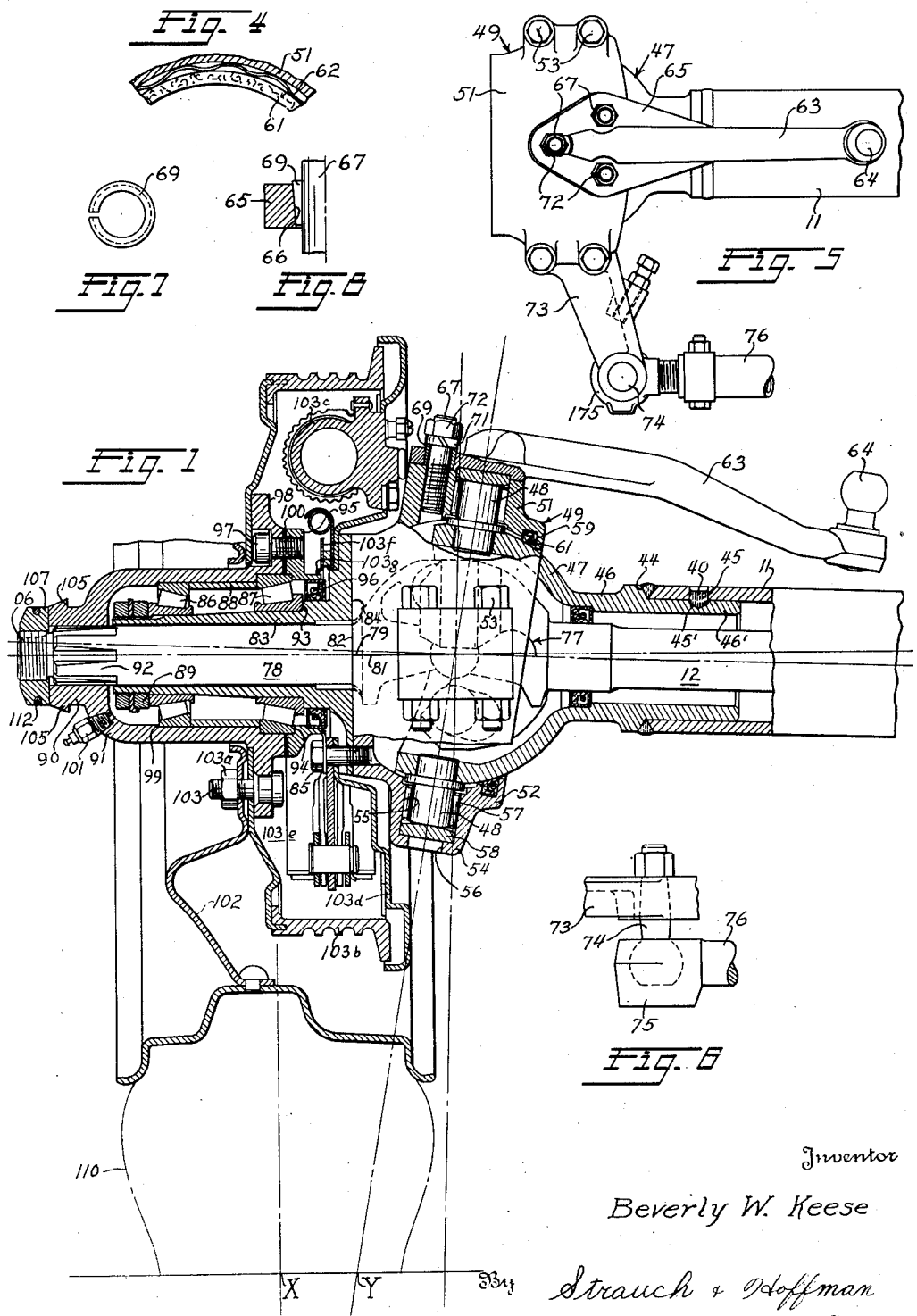

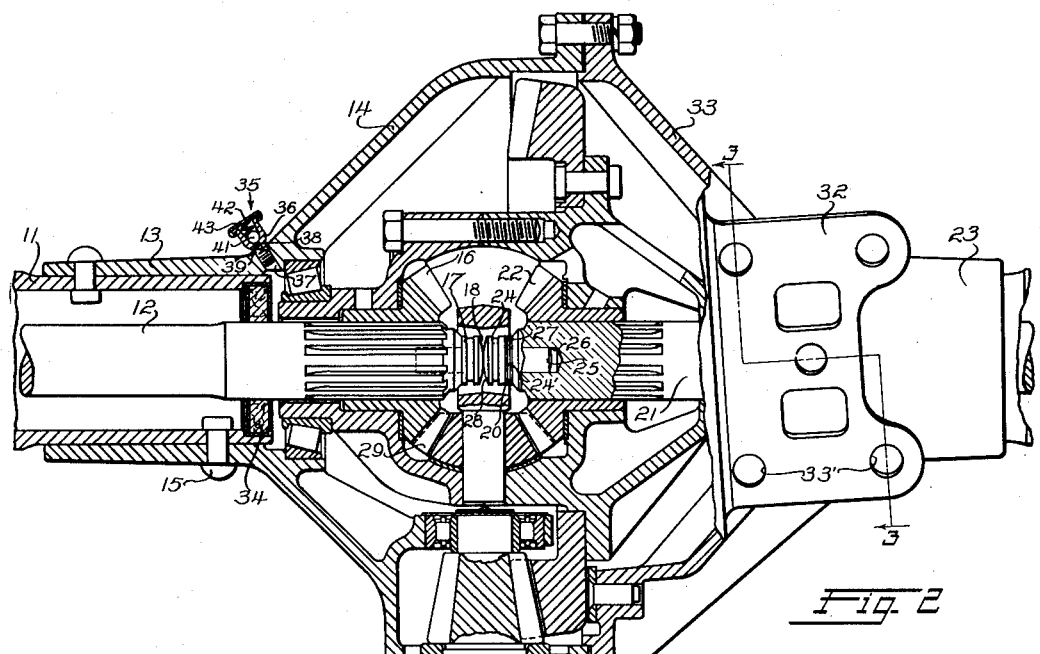

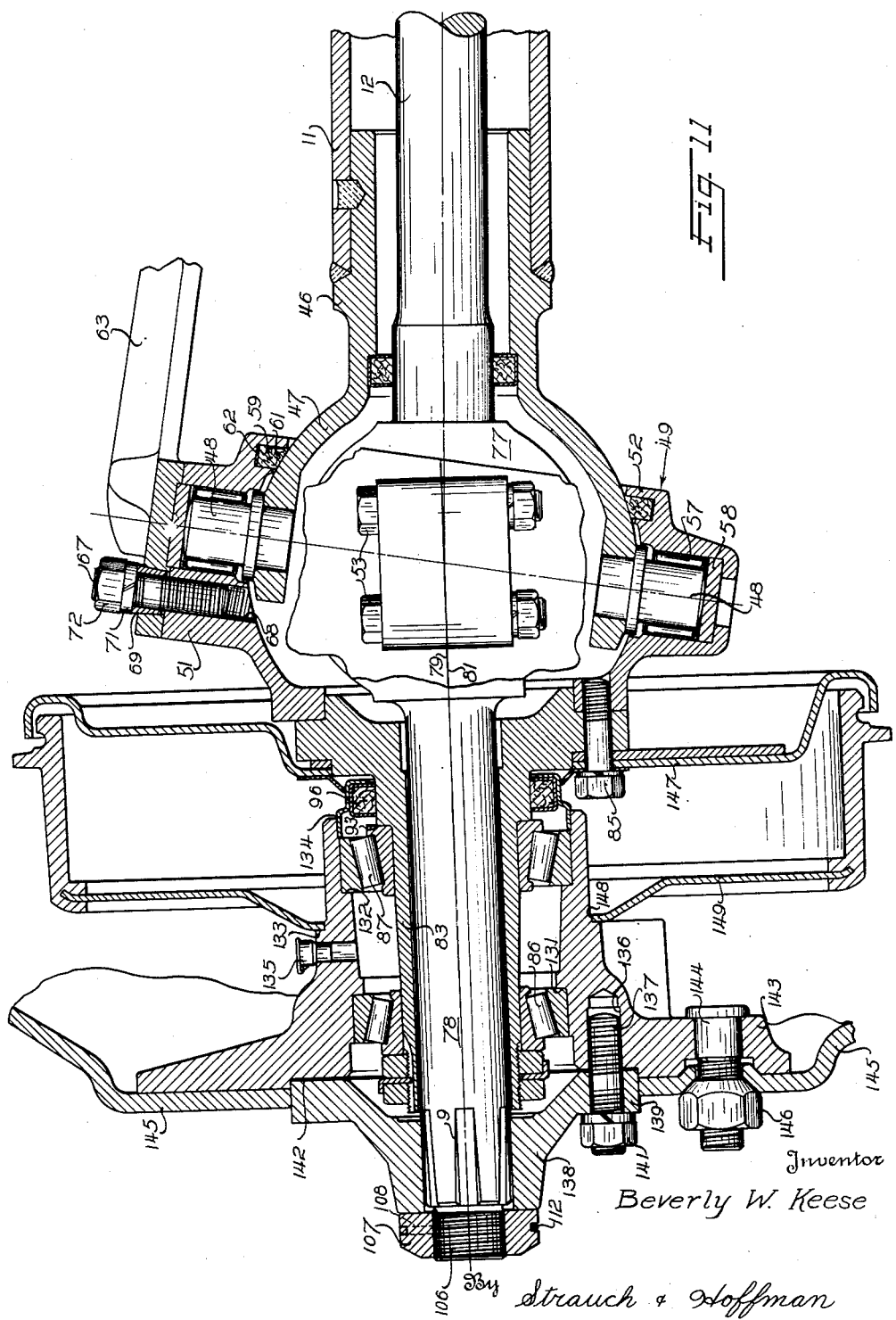

2,356,164

UNITED STATES PATENT OFFICE 2,356,164

STEERING WHEEL DRIVE FOR VEHICLES

Beverly W. Keese, Oshkosh, Wis., assignor to The Timken-Detroit Axle Company, Detroit, Mich., a corporation of Ohio Application August 3, 1940, Serial No. 350,916

10 Claims. (Cl. 180—43)

This invention relates to driven steering axles and methods of assembly and more particularly to driven steering axles of the full floating type and methods of assembly therefor. Various types of full floating steer drive axles are well known. Such prior axles have, however, required the use of special wheel and brake mountings with structures and bearing mountings that are comparatively difficult to adjust, and steer, and which are comparatively expensive to manufacture.

A primary object of the present invention is therefore to provide improved full floating steer drive axles which may be readily assembled, disassembled and adjusted, in novel manner.

Another object of my invention is to provide steer drive axles utilizing standard quantity production pleasure car and truck wheel and brake assemblies, yet having wheel bearings of ample capacity to withstand the stresses of steer drive operation.

A further object of the invention is to provide a novel two part sleeve and wheel supporting bearing assembly in a steering drive axle of the full floating type wherein the bearing assembly is located and adjusted prior to mounting the wheel hub.

A further object of the invention is to provide in a steering drive axle a novel differential bowl section and spring pad construction permitting a maximum offset of the differential bowl, and providing a maximum engine pan clearance.

A still further object of the invention is to provide a novel internal pressure relief outlet for axles which prevents entry of dirt and water to the gearing when the pressure within the housing is below a predetermined level.

A still further object of the invention is to provide in a steer drive axle, a novel readily and accurately machinable swivelled housing mounted on inclined trunnions in a manner to provide effective wheel camber, and a self steering tendency.

Further objects of the invention will appear as the description proceeds in connection with the appended claims and the annexed drawings in which:

Figure 1 is a front elevation partly in section of the long side of a steering drive axle of the invention illustrating structural details of the wheel mounting and axle housing.

Figure 2 is a plan view of the differential bowl of the axle of Figure 1 illustrating the spring seat on the bowl cover and a check valve for venting the bowl.

Figure 3 is a section taken along line 3—3 of Figure 2 illustrating the spring pad construction.

Figure 4 is a diagrammatic view illustrating my spring pressed sealing ring assembly.

Figure 5 is a top plan view of the steering arm and knuckle arrangements of the axle of Figure 1.

Figure 6 is a fragmentary view illustrating the universal connection of the steering knuckle to the tie rod.

Figure 7 is an enlarged section illustrating the split tapered bushing surrounding the bolts securing the steering arm to the steering knuckle housing.

Figure 8 is a plan view of the split bushing of Figure 7.

Figure 9 is an end view of the removable hub illustrating the wheel pulling shoulder.

Figure 10 is an end view of the nut and snap ring assembly on the threaded end of the stub shaft.

Figure 11 is a front elevation of the long side of an axle comprising a further embodiment of the invention adaptable for single or dual wheels.

Referring to Figures 1 and 2, the steer drive axle of the invention comprises a non-rotatable hollow tubular axle housing 11 through which extends a driven axle shaft 12. The inner end of housing 11 is tightly fitted within a tubular collar 13 integral with differential bowl 14. As illustrated in Figure 2, housing 11 and collar 13 are preferably rigidly attached as by rivets 15 although any suitable alternative fastening operation can be employed.

Differential bowl assembly

The inner end of shaft 12 is provided, beyond its splined portion carrying gear 16, with a button 17 of reduced cross section having a convex end face 18. Button 17 may be made integral with shaft 12, but preferably it comprises the head of a cap screw threaded into a tapped axial hole 19 at the end of shaft 12.

At the short side of the axle, a short axle shaft 21 carrying at its inner splined end a gear 22 extends through a tubular collar 23 integral with bowl 14 and carries at its inner end a button 24 similar in shape to button 17. Button 24 is provided with a shank 25 pressed within an axial bore 26 at the inner end of shaft 21.

Button 24 is spaced from the end face of shaft 21 by a plurality of shims 27 and, when the axle shafts are correctly positioned as illustrated in Figure 1, convex face 28 of button 24 is in contact with face 18 of button 17.

My novel method of assembling the axle to obtain proper positioning of shafts 12 and 21 will be later described.

Gears 16 and 22 mesh with a differential gear 29 and are driven by a shaft 31 which is connected to the usual propeller shaft. Except for buttons 17 and 24 and the mechanism mounting them, all the shafts, gearing and other details within bowl 14 are conventional and do not comprise part of the invention, and in the preferred embodiment herein illustrated I employ a differential gearing assembly of the type employed in the well known Ford one-ton truck rear axle illustrated in United States Patent 1,946,051 to Herbert W. Alden.

In steering drive front axles it is desirable that the differential bowl be located as far laterally offset from the vehicle longitudinal center line as possible to avoid interference with the engine crankcase and to provide a vehicle front end of minimum height. In prior constructions the presence of spring pads on the axle housing between the differential bowl and adjacent wheel at the short side of the axle appreciably limited this offset. I have increased the available offset for this purpose by casting the right front spring pad 32 integral with the cover section 33 of bowl 14. Pad 32 is provided with tapped holes 33' for reception of the usual spring studs.

With the vehicle operating at high speeds and under other high temperature conditions, gases are evolved within the differential bowl which tend to build up pressures within the bowl and should be vented to prevent injury to the oil seals such as seal 34. Devices for venting the bowl now employed usually comprise apertures drilled in the bowl walls and these apertures are provided with fittings providing open but tortuous passages to the atmosphere. These permanently open passages permit entry of considerable dirt and water to the interior of the bowl especially where sub-atmospheric pressures are developed within the bowl as during cooling. To prevent this entry of water and dirt I provide a check valve assembly 35 for the differential bowl, as illustrated in Figure 2.

Check valve 35 comprises a short tube 36 threadedly secured within an aperture 37 leading to the interior of bowl 14. Tube 36 has a central bore 38 terminating in a valve seat 39 closed by a ball 41. A suitable apertured sheet metal cap 42 is fixed upon the outer end of tube 36, and a spring 43 reacting between cap 42 and ball 41 retains the ball normally on seat 39 to keep bore 38 closed.

Spring 43 is of such design that it will permit pressure within bowl 14 to unseat ball 41 when a predetermined pressure has been attained. This predetermined pressure is well below the limit which seal 34 and the other shaft seals are capable of withstanding without injury.

Valve 35 is hereby normally closed against entry of dirt and water and is open only under conditions during which fluid flow outwardly of the bowl only is possible. I have found that a spring pressure of about 12 to 16 ounces on ball 41 gives excellent results in service.

Wheel mounting

At the long side of the axle, axle housing 11 is secured to a hollow tube 46 which is enlarged at its outer end to provide a cup-shaped spherical surfaced socket member 47. Tube 46 and socket 47 thereby comprise integral parts of the axle housing when assembled and are therefore non-rotatable.

Collar 46 is formed with an inclined shoulder 44 and an extension 46' of reduced external diameter beyond the shoulder. Housing 11 is telescoped over extension 46' until its inclined end face approaches shoulder 44 to provide a V-shaped notch.

A series of apertures 45 are drilled through housing 11 and into extension 46' to provide a series of pockets 45' in extension 46'. Housing 11 and extension 46' are then permanently secured together by welding in the notch between shoulder 44 and the housing end face and by rivet welding at 40 wherein the welded material bridges each aperture 45 and its associated pocket.

Alternatively housing 11 and collar 46 may be butt welded as disclosed in Alden Patent No. 2,075,563.

Spherical socket member 47 is provided with diametrically opposite apertures in which are press fitted cylindrical trunnions 48. A housing 49, consisting of mated upper and lower portions 51 and 52 secured as by bolts 53, has spherical surfaces fitting about socket 47.

Each housing portion is formed with an integral hollow projection 54 having cylindrical internal walls 55 accessible for machining through an aperture 56 at the end of projection 54. Trunnions 48 fit within projections 54 and are surrounded by a sleeve of elongated roller bearings 57, preferably of the needle type, arranged on walls 55.

Trunnions 48 are hardened ground steel and to prevent undue wear on projection 54, which is usually a relatively soft forging, I provide a hardened steel crowned washer 58 of larger diameter than aperture 56 seated on the annular machined surface 55' at the bottom of each projection 54 and bearing on the end face of each trunnion. The crown of washer 58 is adjacent the trunnion end face and is sufficiently large to prevent undue friction with the trunnion end faces, but it is also designed to provide sufficient area of contact between the washers and trunnion end faces to carry the thrust load exerted by the trunnions as housing 49 rocks thereabout.

The parts are designed with a total clearance of .005 inch between top washer 58 and the end face of its associated trunnion. This enables an oil film to be maintained between the upper trunnion and washer assembly.

The weight of joint 77 and the accurate seating of washer 58 on lower surface 55' closes aperture 56 against entry of dirt and water and prevents leakage of oil from the housing. Housing portions 51 and 52 are formed with mating grooves 59 carrying an annular ring 61 of sealing felt or like material engaging the spherical surface of socket 47. To insure a tight seal at this point I provide a substantially circular band 62 of flat crimped spring metal extending along the bottoms of grooves 59 (Figure 4). Spring 62 maintains sealing felt 61 tightly against socket 47 at all times during rocking of housing 49.

Rocking of housing 49 about trunnion 48 is effected by a steering arm 63 formed at its free end with a ball 64 for universal connection to the usual steering gear assembly of the vehicle. Arm 63 is formed with a flat flanged end 65 apertured at 66 to receive a plurality of studs 67 extending therethrough into threaded apertures 68 in housing portion 51. Apertures 66 are tapered and of appreciably larger diameter than studs 67.

Each stud 67 is surrounded by a split tapered bushing 69 located mainly in tapered aperture 68 but spaced above housing portion 51 as illustrated in Figure 5. Beyond bushing 69, each stud 67 is provided with a split lock washer 71 and a nut 72.

As each nut 72 is tightened, bushing 69 is forced downwardly along stud 67 and is securely wedged between the stud and aperture 66. The bushing is circumferentially contracted during this operation and stud 67 is placed under shear stresses as the bushing travels down inclined aperture 66. This assembly is quick and easy, and centers and binds studs 67 against accidental rotation.

Lower housing portion 52 is formed with an integral arm 73 which carries a downwardly extending ball headed stud 74 (Figure 6) fitting within a cooperating socket 75 at the end of a tie rod 76. The other end of tie rod 76 is similarly universally connected to an arm similar to arm 73 and extending from a housing identical with housing 49 at the short side of the axle.

Within socket 47, shaft 12 is connected by a constant velocity universal joint 77 to a stub shaft 78 which extends through the wheel. Joint 77 may be of any suitable constant velocity type, but as shown is of the so-called Bendix-Weiss type in which the ball and slot connection between the parts is such as to permit substantial axial separation of the shaft sections. The inward movements of shafts 12 and 21 are, however, limited by buttons 17 and 24.

The center of joint 77, as illustrated in Figure 1, lies in the line joining the axes of trunnions 48. This line is inclined at an axis of about 9½ degrees to the vertical to provide the necessary caster for steering purposes.

The axis of shaft 78 is inclined at about 2 degrees to the axis of shaft 12 to provide desired camber. In order to properly locate shaft 78 in this relation to shaft 12, I machine the abutting faces 79 and 81 of housing portions 51 and 52 so that when housing 49 is assembled by tightening bolts 53, faces 79, 81 lie in a transverse plane containing the axis of shaft 78. The angle of camber is indicated at A in Figure 1.

Housing 49 has its outer face 82 machined to lie in a plane disposed at 90° to faces 79 and 81. A hollow spindle 83 surrounding shaft 78 has its inner face 84 machined to fit flush with face 82 and is secured rigidly to housing 49 as by bolts 85. In this manner the inclination of housing face 82 alone determines the angle of camber of the stub shaft. Spindle face 84 is normal to the spindle axis and therefore I am enabled to machine the spindle and assemble the bearing and hubstructures thereon without forming specially inclined faces on the spindle or hub, thereby providing for maximum ease and accuracy of machining of these parts, and hence maximum accuracy of bearing alignment and mounting. Any small inaccuracy in the angle of face 82 results only in a slight change in camber angle, which is not serious.

Provision of camber as above described brings the point at which the center of the tire periphery contacts the ground close to the trunnion axis. This results in easy steering.

Furthermore steering movement of the spindle 83, due to the inclined trunnion axis, tends to raise the axle. The load on the axle resists raising of the axle and results in a tendency of the wheels to return to straight ahead position. This self steering tendency is also an aid to easy steering.

The lower races of a pair of spaced tapered wheel supporting roller bearing assemblies 86 and 87 are press fitted on spindle 83. A collar 88 spaces the bearing assemblies being disposed between the outer races. The outer end of spindle 83 is externally threaded and provided with a suitable lock nut arrangement 89 for locating and adjusting the bearings on the spindle. Bearing 87 is larger than outer bearing 86. The purpose of this arrangement is to provide sufficient bearing capacity to enable the use of standard pleasure car wheels and brakes upon the axle of the invention. Such pleasure car wheels are relatively low in cost and of sufficient strength for steer drive of axles of lower capacities. For example, Chevrolet wheels and brakes are suitable for ½ ton capacity axles of this type. The use of such wheels and brakes therefore contributes to economy in manufacture and production efficiency.

Wheel hub 91 is non-rotatably mounted on the tapered splined section 92 of shaft 78. The inner race of bearing 87 abuts against a shoulder 93 on spindle 83. The outer race of bearing 87 is fitted into a recessed shoulder 94 cut in a substantially annular collar 95 surrounding the spindle inwardly of bearing 87. In assembling the bearing before adjustment, collar 95 is slid over spindle 83 and then bearing 87 is advanced against shoulder 93.

The upper race of bearing 87 and an oil seal 96 between collar 95 and spindle 83 temporarily support collar 95 at this stage. Then spacer 88 and bearing 86 are mounted on the sleeve and lock nut assembly 89 is manipulated in the usual manner to obtain and set proper adjustment for the bearings.

Wheel hub 91, which is formed with an internally splined collar 90 fitting with tapered spline shaft section 92, is then forced on shaft 78. Spaced bolts 97 are employed to secure the inner hub flange 98 to collar 95. As bolts 97 are drawn tight, the outer races of bearings 86 and 87 are drawn tight against an internal shoulder 99 in hub 91, spacer 88 and shoulder 94. Collar 95 thereby effectively becomes an integral part of the hub.

A suitable grease cup 101 is provided on hub 91. Oil seal 96 prevents escape of grease from the bearing chamber to the brake or other wheel mechanism. A soft oil-tight gasket 100 is employed between hub flange 98 and collar 95.

As illustrated in Figure 1, a pneumatic tired ground engaging wheel 102 is mounted on hub 91. Hub flange 98 is provided with a plurality of non-rotatable bolts 103 extending through aligned apertures in the wheel and suitable nuts 103a are employed to secure the hub flange and wheel together. Brake drum 103b is also secured to hub flange 98 by tightening nuts 103a on bolts 103. A suitable hydraulic brake operating cylinder 103c on the stationary brake mechanism support 103d actuates the usual pivoted brake shoes 103e into contact with the inner braking surface of drum 103b. Support 103d is secured to spindle 83 by bolts 85 which secure the spindle to housing 49. While any suitable wheel and brake assembly may be employed at 102 and 103a—103e, I have illustrated standard Chevrolet pleasure car wheels and hydraulic brake assembly which are available in quantity production.

Bolts 85 also clamp upon the brake support 103d a dirt seal element 103f which is formed with an inclined portion 103g extending to seal 96 to throw off dirt entering the interior of the brake assembly and prevent it from injuring seal 96.

Each wheel is equipped with a 16 x 5.50 pneumatic tire 110. The peripheral center line of tire 110 intersects ground level at the point X in Figure 1. The line representing the trunnion axes extended intersects ground level at Y in Figure 1. Employing the above-mentioned Chevrolet wheel and brake assembly I find that a distance X—Y of approximately 1 7/8 inches is very satisfactory for efficient steering.

Referring to Figure 9, hub collar 90 is formed with opposed flat peripheral surfaces 104 and opposed radially projecting integral formations 105 providing wheel puller shoulders for use in removing hub 91 when desired. Wheel-puller prongs may be inserted over surfaces 104 and then rotated in back of projections 105 for the purpose of pulling hub 91 off tapered splines 92.

Figures 1 and 10 illustrate a novel nut locking device. The end of shaft 78 is threaded at 106 to receive a nut 107 having a plurality of radial bores 108 connected by a circumferential groove 109. Shaft section 106 is formed with an axial keyway 111. A snap ring of relatively heavy spring wire is formed with an arcuate portion 112 terminating at one end in an inward radial spur 113. Spur 113 is of such length that when nut 107 is turned to place a bore 108 in alignment with keyway 111, spur 113 is thrust into the aligned bore until its end is disposed in the keyway as shown in Figure 10, and then arcuate ring portion 112 is snapped into groove 109.

This snap ring locks nut 107 against rotation as effectively as a cotter key and is more reliable than a cotter key in that its inherent resiliency keeps it snugly on the nut. Further my snap ring has none of the objectionable sharp projecting edges of the usual cotter key and is safer to handle.

*Assembly method*

In assembling the axle, because of the structure of the constant velocity joint illustrated, care must be taken that shafts 12 and 21 have proper axial spacing. Accordingly, I first assemble the long side of the axle into the position illustrated in Figures 1 and 2 wherein fixed button 17 is seated at the inner end of shaft 12 and its surface 18 lies adjacent the center line of pinion 29 and the universal joint center lies in the trunnion axis. During assembly of the long side of the axle, I adjust bearing assemblies 86 and 87 prior to mounting hub 91 as above explained.

This setting of the long side of the axle is not disturbed during the remainder of the assembly. The reason for selecting long shaft 12 for carrying the fixed button 17 is solely that shaft 12 offers slightly more difficulty in handling than shorter shaft 21 in the manipulations to be herein described. It is therefore within the scope of the invention to provide the fixed button on either shaft 12 or 21 and manipulate the other in the manner to be described.

The universal joint and sleeve and hub arrangements at the short side of the axle are identical with those disclosed in Figure 1 and are therefore not illustrated or described to avoid needless repetition. The tubular axle housing at the short side of the axle corresponding to housing 11 is secured to bowl collar 23 by the riveting operation employed at the long side of the axle. Reference to corresponding numerals will be employed in the following assembly description for the short side of the axle.

With long shaft 12 in position, the first step is to select a button 24 with a shank having a light tap fit in hole 26. I tap this button toward the planar end face 20 of the short shaft 21 until the planar under side 24' of button 24 is spaced about one-half inch from face 20. This distance may of course vary with the type of button or the size of the differential assembly. Shims 27, illustrated in Figure 2, are not yet provided so that button 24 can be displaced further toward face 20 upon application of suitable axial pressure.

I then insert shaft 21, with universal joint 77 and stub shaft 78 attached, into the short side of axle housing and differential bowl 14 until the button end faces 18 and 28 are in light contact. This can be determined by a slight axial pressure insufficient to displace button 24.

I then assemble housing 49 on socket member 47 and secure spindle 83 to the housing by tightening at least two bolts 85. In this operation, care is taken not to push short shaft 21 inwardly further than required by assembly of housing 49. Any necessary inward displacement of shaft 21 during this operation, however, shifts button 24 toward face 20.

I then assemble collar 95, bearing assemblies 86, 87, spacer 88 and hub member 91 on spindle 83 in the manner above described. Only one nut of assembly 89 is employed to hold the bearings in position, reserving final adjustment to a later step. Especial care must be taken, while fitting hub collar 90 upon splined shaft section 92, not to push shaft 21 inwardly. To this end I first draw up nut 107 tightly to insure location of hub member 91 in its correct axial position relative to shaft 78, and then tighten bolts 97.

Gasket 100 is omitted during this operation and at least two bolts 97 are tightened to draw the hub members and bearing assembly tight. This operation results in a further slight inward displacement of shaft 21 with consequent shifting of button 24 toward face 20 unless, of course, the shaft is already properly located.

I then dismantle the above temporary assembly by removing bolts 97 and 85 and dismounting housing 49, care being taken not to push shaft 21 further inwardly. Shaft 21 is then pulled out and the axial distance between faces 24' and 20 measured accurately.

Tap fit button 24 is removed from the end of shaft 21. A shim pack 27 of a thickness equal to this measured distance is made up and placed on a button 24 identical with the removed tap fit button but having a press fit shank 25 within hole 26. Preferably shim tolerances are +0 and −1/32 inches. Button 24 is pressed tightly inwardly until shim pack 27 is solid and this is the final position of button 24 on shaft 21.

Housing 49 is then remounted on socket member 47 and spindle 83 secured thereto. All bolts 85 are tightened in this operation which is a final assembly step. Then collar 95, bearing assemblies 86, 87 and spacer 88 are remounted on spindle 83. Both lock nuts 89 are employed in this operation during which bearings 86 and 87 are adjusted to final position.

Hub member 91 is then attached to the shaft and collar 95. During this operation, gasket 100 is placed between the hub and collar, and in addition I place a shim of selected thickness between the hub and collar coextensive with gasket 100. In the illustrated assembly, good results are obtained by employing a shim 1/32 inches thick.

Such a shim effectively increases the length of the hub axially of the axle so that, when the hub is tightened to final position by drawing up on all bolts 97, the inner face 28 of button 24 is spaced from face 18 of button 17 a distance equal to the combined shim and gasket thickness at 100 as a minimum, or a distance equal to the above minimum plus 1/32 inch as a maximum.

In any event, the spacing between shafts 12 and 21 within the differential bowl can be selected within 1/32 inch limits by suitable combined shim and gasket thicknesses at 100.

The above-described method of assembly is simple and speedy and can be accomplished by any ordinary mechanic following given directions.

Further embodiment

Figure 11 illustrates an embodiment of the invention wherein the hub construction is designed to utilize wheels and brakes that match with standard dual type rear truck wheels on a steer-drive axle.

This axle is mainly of the same construction as Figure 1, corresponding parts being indicated by the same numerals, and differs therefrom substantially only by the hub and bearing arrangements hereinafter described.

Hollow spindle 83 is secured to housing 49 by bolts 85 which also secure the brake supporting flange 80 to the housing. Inner large bearing assembly 87 is mounted on spindle 83 with its lower race seated against shoulder 93 as in Figure 1. Spaced outer bearing assembly 86 is also mounted on sleeve 83, but instead of the spacer collar 88 of Figure 1, the adjacent ends of the outer races of bearings 86 and 87 are seated against shoulders 131 and 132, respectively, formed in hub member 133.

Pressed into a bore in the inner end of hub 133 is a flanged sheet metal seal receiving sleeve 134 which receives lubricant seal 96. A grease cup 135 of suitable design is provided on hub member 133.

The outer end of hub 133 is formed with a plurality of tapped holes 136 in which are threaded studs 137. A hub cap 138, having a central portion internally splined to interfit with tapered splined shaft section 92, has a radial flange 139 apertured to fit over studs 137. Suitable nut and lock washer assemblies 141 are employed on studs 137 to draw hub cap 138 tightly against inner hub member 134. A suitable grease tight gasket 142 is clamped between hub cap 138 against hub member 134.

Inner hub member 133 is formed with a wide integral radial flange 143 in which is non-rotatably seated a circumferential row of bolts 144 adapted to project through suitable apertures in a wheel 145. Nuts 146 secure a wheel 145 to the hub.

The single wheel 145 as illustrated matches with a standard type of rear dual truck wheel. If desired, however, for heavier duty axles, dual wheels may be used since flange 143 is of such nature that any usual dual wheel assembly can be mounted directly on studs 144.

The stationary brake mechanism support 147 is attached to spindle 83 by bolts 85 as in Figure 1. Hub member 133 is provided with a suitable annular shouldered section 148 upon which is seated brake drum 149. Drum 149 is made rigid with hub 133 as by welding at 148.

The bolt and snap ring assembly 107 above described is used to lock the hub against outward axial movement on shaft 78.

Assembly of this embodiment of the invention is substantially the same as in that of Figures 1 and 2. The combined shim and gasket thickness at 142 determines the axial spacing of the long and short axle shafts.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a steer drive axle; an axle housing having an enlarged socket member at its end; an axle shaft in said housing; axially aligned trunnions on said socket member; a split housing comprising upper and lower housing portions secured about said socket member rockable upon said trunnions, said housing portions having abutting faces lying in a common substantially transverse plane inclined at a small angle to the axis of said axle shaft and having aligned end faces normal to said plane; a hollow spindle having an end face normal to its axis secured to said housing with said spindle end face flush with said housing end faces so that the spindle axis is inclined at said angle to said axle shaft axis; a stub shaft projecting axially through said spindle; and a universal joint connecting said shafts at said socket member.

2. In a steer drive axle, a rockable hollow spindle, a rotatable stub shaft extending through said spindle, spaced bearing assemblies on said spindle, means on said spindle for adjusting said bearing assemblies, a hub collar disposed axially inwardly of the inner bearing assembly, an outer hub member non-rotatably secured upon said stub shaft and rotatably carried by said bearing assemblies and means rigidly securing said hub member to said collar.

3. In a steer drive axle, a swiveled hollow spindle, a rotatable stub shaft extending through said spindle, a splined section on said shaft beyond said spindle, axially spaced bearings supported on said spindle, with the innermost bearing being of larger capacity than the outermost bearing, an inner hub member disposed inwardly of the innermost bearing, an outer hub member secured upon said splined shaft section and rotatably carried by said bearings, and means securing said hub members together.

4. In a steer drive axle, an axle housing having an enlarged end socket; axially aligned upper and lower trunnions on said socket; a steering knuckle housing on said socket member rockable about said trunnions; integral cup-shaped top and bottom projections on said steering knuckle housing surrounding said trunnions, the bottom projection having an apertured end wall of a diameter smaller than the cup; cylindrical roller sleeves between the inner walls of said projections and said trunnions, and upper and lower hardened thrust bearing members between the ends of said trunnions and closing said cup-shaped projections, the bottom member seating against the bottom of said bottom cup-shaped projection adjacent the apertured wall thereof and disposed in fluid sealing engagement therewith.

5. A steer drive axle as defined in claim 4, in which the lower one of said thrust members is crowned to reduce the thrust bearing area of the lower trunnion.

6. In a steer drive axle assembly, a rockably mounted hollow spindle which is non-rotatable about its longitudinal axis, a rotatable stub shaft extending through said spindle, said shaft terminating in a splined section and a threaded section in order, an elongated open-ended hub member surrounding and substantially coextensive longitudinally with said spindle and widely axially spaced bearings between said hub member and spindle, a substantially radial flange on said hub member and means on said flange for attachment of a vehicle wheel, an internally splined hub cap mounted on the splined section of said shaft and having a radial flange rigidly secured to said hub member, a fastening element on the threaded section of said shaft for retaining said hub cap on said splined section of the shaft, and a grease seal between the inner end of said hub member and said spindle.

7. In a full floating steer drive axle assembly, a non-rotatable axle housing having a rotatable axle shaft therein; a hollow wheel-supported spindle swingably mounted on trunnions on said axle housing; a stub shaft extending through said spindle and a constant velocity universal joint connecting said stub shaft to said axle shaft, said shaft terminating exteriorly of said spindle in a tapered splined section and a threaded section in order; an internally tapered splined cap member mounted on the splined section of said shaft and having a radial flange; a wheel hub surrounding said spindle and journalled on widely axially spaced bearings between said hub and said spindle; means for rigidly securing said hub to the flange of said cap member; and means secured to the threaded portion of said stub shaft for restraining said cap and hub against axial displacement.

8. In a full floating steer drive axle assembly, a stationary housing having opposed trunnions; an axle shaft in said stationary housing; a hollow spindle mounted for steering movement on said trunnions; a pair of comparatively widely spaced anti-friction bearings mounted on said spindle; a hub member having a sleeve portion substantially co-extensive with said bearings and supported thereon for accurate rotation about the axis of said spindle; a stub shaft extending through said spindle in spaced relationship to the walls thereof; means mounting said stub shaft for accurate rotation about the axis of said spindle, including a connection carried by said hub having internally splined surfaces tightly fitting tapered splines on the outer end of said stub shaft; means for maintaining said splined connection in assembled relationship; and a constant velocity universal joint connecting said stub shaft to said axle shaft and having an axis of oscillation substantially aligning with the axis of said trunnions, said splined connection affording the sole support for said stub shaft and the outer end of said axle shaft, whereby said stub shaft may flex radially in response to minor misalignment of said universal joint with said trunnion axis.

9. In a steer drive axle, a rockable hollow spindle; a rotatable stub shaft extending through said spindle; spaced inboard and outboard bearings on said spindle, each comprising inner and outer races and interposed rolling elements; a hub collar disposed axially inwardly of the inboard bearing and having a shoulder engaging the inner face of the outer race thereof; an outer hub member non-rotatably secured to said stub shaft and rotatably carried by said bearing assemblies and having a shoulder abutting the outer face of the outer race of said inboard bearing; and means rigidly securing said hub member to said collar and clamping the outer race of said inboard bearing between their respective shoulders.

10. The steer drive axle defined in claim 9, together with a sleeve-like spacer member disposed inside said hub member and abutting the neighboring faces of the outer races of said bearings.

BEVERLY W. KEESE.